(12) United States Patent
Choi (10) Patent No.: US 8,964,377 B2
(45) Date of Patent: Feb. 24, 2015

(54) ELECTRONIC DEVICE HAVING SLIDE-TILT OPERATION

(75) Inventor: Sung-wook Choi, Seongnam-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 273 days.

(21) Appl. No.: 13/562,451

(22) Filed: Jul. 31, 2012

(65) Prior Publication Data

US 2013/0058048 A1    Mar. 7, 2013

(30) Foreign Application Priority Data

Sep. 7, 2011    (KR) .................. 10-2011-0090735

(51) Int. Cl.
*G06F 1/16*    (2006.01)

(52) U.S. Cl.
CPC ............ *G06F 1/1624* (2013.01); *G06F 1/1681* (2013.01); *G06F 1/1683* (2013.01)
USPC ................ 361/679.55; 361/679.26

(58) Field of Classification Search
USPC ........................ 361/679.55, 679.26
See application file for complete search history.

(56) References Cited

U.S. PATENT DOCUMENTS

| | | | |
|---|---|---|---|
| 4,960,256 A * | 10/1990 | Chihara et al. ............. | 248/286.1 |
| 6,091,601 A * | 7/2000 | Schlesener et al. ...... | 361/679.28 |
| 7,027,297 B1 * | 4/2006 | Mizuno et al. ........... | 361/679.07 |
| 7,448,872 B2 * | 11/2008 | Im .................. | 439/10 |
| 7,652,873 B2 * | 1/2010 | Lee .......... | 361/679.06 |
| 7,924,554 B2 * | 4/2011 | Shen .......... | 361/679.21 |
| 7,929,284 B2 * | 4/2011 | Shen .......... | 361/679.21 |
| 7,929,285 B2 * | 4/2011 | Shen .......... | 361/679.21 |
| 7,969,739 B2 * | 6/2011 | Tsunoda et al. ......... | 361/704 |
| 7,986,984 B2 * | 7/2011 | Ou .............. | 455/575.4 |
| 8,248,788 B2 * | 8/2012 | Wu et al. .......... | 361/679.55 |
| 8,259,437 B2 * | 9/2012 | Vesely .......... | 361/679.01 |
| 8,284,554 B2 * | 10/2012 | Stone et al. .......... | 361/679.56 |
| 2003/0103324 A1 * | 6/2003 | Gallivan ............ | 361/681 |
| 2005/0130720 A1 * | 6/2005 | Finke-Anlauff ........... | 455/575.3 |
| 2006/0073859 A1 * | 4/2006 | Chou .......... | 455/575.4 |
| 2008/0174942 A1 * | 7/2008 | Yang et al. .......... | 361/680 |
| 2009/0233659 A1 * | 9/2009 | Ke et al. ........ | 455/575.3 |
| 2012/0063072 A1 * | 3/2012 | Murakoso et al. ....... | 361/679.01 |
| 2012/0092820 A1 * | 4/2012 | Hautamaki et al. ...... | 361/679.02 |
| 2013/0255995 A1 * | 10/2013 | Mai et al. ........ | 174/136 |

* cited by examiner

*Primary Examiner* — Lisa Lea Edmonds
(74) *Attorney, Agent, or Firm* — Staas & Halsey LLP (57) ABSTRACT

An electronic device includes a first body and a second body that may be disposed in a first position in which the second body overlaps the first body, a second position in which the second body is slid from the first body, and a third position in which the second body is tilted with respect to the first body, and includes an exposure prevention member that prevents a flexible connection member that electrically connects the first and second bodies from being externally exposed when the first and second bodies are disposed in the third position.

24 Claims, 8 Drawing Sheets

ELECTRONIC DEVICE HAVING SLIDE-TILT OPERATION

CROSS-REFERENCE TO RELATED APPLICATIONS

This application claims priority from and the benefit 35 U.S.C. §119 of Korean Patent Application No. 10-2011-0090735, filed on Sep. 7, 2011, in the Korean Intellectual Property Office, the disclosure of which is incorporated herein by reference.

BACKGROUND

1. Field

The present general inventive concept relates to an electronic device that has two bodies capable of moving between an overlapping position and a slid-and-tilted position according to a slide-tilt operation.

2. Discussion of the Background

From among electronic devices, such as a communication terminal, a game console, a multimedia device, a laptop computer, and a tablet computer, particularly, a portable mobile device includes a display unit for visually providing information and a manipulation unit for manipulating the portable mobile device. The display unit and the manipulation unit may be separately mounted on two different bodies of the device. By sliding and tilting the bodies, the manipulation unit, the display unit, or both may be switched between an operation state for allowing a user to use the portable mobile device and a pause state for carrying or holding the portable mobile device.

As such, a connection member for electrically connecting the two bodies when the bodies are separated is required. The connection member is used to transmit electrical signals and power between the two bodies. If the connection member is externally exposed, the appearance of a product may be diminished. Also, if the connection member is externally exposed, the connection member may be damaged by an external impact.

SUMMARY

The present general inventive concept provides an electronic device of which two bodies are capable of sliding and tilting and in which a flexible connection member for electrically connecting the two bodies is not externally exposed.

Additional features and utilities of the present general inventive concept will be set forth in part in the description which follows and, in part, will be obvious from the description, or may be learned by practice of the general inventive concept.

According to features and utilities of the present general inventive concept, there is provided an electronic device including a first body including a first printed circuit board (PCB); a second body including a second PCB, and the second body being moveable between a first position at which the second body at least partially overlaps the first body, a second position at which the second body is extended from the first body, and a third position at which the second body is rotated with respect to the first body; a slide member disposed between the first and second bodies, the slide member being rotatably coupled to the first body and slidably coupled the second body; a flexible connection member to electrically connect the first and second PCBs; a first opening formed in an upper surface of the first body, the connection member extending through the first opening; a second opening formed in a lower surface of the second body, the connection member extending through the second opening, the upper surface of the first body and the lower surface of the second body being adjacent to and facing each other when the second body is disposed at the first position, and the first opening and the second opening being disposed at opposite sides of the first surface and second surface, respectively, when the second body is disposed at the first position; and an exposure prevention member disposed to prevent the connection member from being exposed between the first opening and the second body when the second body is disposed at the third position, the exposure prevention member rotating together with the slide member.

The electronic device may further include a rotation shaft about which the second body rotates to the third position, and a protection member disposed between the exposure prevention member and the rotation shaft to form together with the exposure prevention member a space through which the connection member passes, the protection member rotating together with the slide member.

The protection member may prevent the connection member from interfering with the rotation shaft when the second body is disposed at the first position, the second position, and the third position.

The first opening may be covered by the slide member when the second body is disposed at the first position and the second position, and the second opening may be covered by the slide member when the second body is disposed at the second position and the third position.

The second opening may be formed behind a front surface of the second body and may be covered by the first body when the second body is disposed at the first position.

According to features and utilities of the present general inventive concept, there is provided an electronic device including a first body including a first printed circuit board (PCB); a hinge unit including a fixed plate fixed to the first body, a rotation shaft connected to the fixed plate, and a rotating plate being rotatable about the rotation shaft; a slide member connected to the rotating plate and being rotatable about the rotation shaft with respect to the first body; a second body including a second PCB, the second body being slidably connected to the slide member, and the second body being moveable between a first position at which the second body overlaps the first body, a second position at which the second body is slid on the slide member and extended from the first body, and a third position in which the second body is tilted with respect to the first body according to a rotation of the slide member; a flexible connection member to electrically connect the first and second PCBs; a first opening formed in an upper surface of the first body, the connection member extending through the first opening, and the first opening being covered by the slide member if the second body is disposed at one of the first position and the second position; a second opening formed in a lower surface of the second body, the connection member extending through the second opening, and the second opening being covered by the slide member when the second body is disposed at one of the second position and the third position; and an exposure prevention member connected to the slide member to prevent the connection member from being exposed when the second body is disposed at the third position.

The second opening may be located behind a front surface of the second body and may be covered by the first body when the second body is disposed at the first position.

The connection member may pass through the first opening at a rear side of the rotation shaft.

The exposure prevention member may extend through the first opening into the first body.

The electronic device may further include a protection member to prevent interference between the rotation shaft and the connection member.

The protection member may rotate together with the slide member.

The protection member may prevent the connection member from being exposed to a front side of the electronic device when the second body is disposed at the third position.

The protection member may extend from the slide member through the first opening into the first body.

The protection member may extend between the exposure prevention member and the rotation shaft to form together with the exposure prevention member a space through which the connection member passes.

The protection member may prevent the connection member from interfering with the rotation shaft when the second body is disposed at the first position, the second position, and the third position.

According to features and utilities of the present general inventive concept, there is provided an electronic device including a first body including a first printed circuit board (PCB); a second body including a second PCB; a slide member slidably connected to the second body; a hinge unit to rotatably connect the slide member and the first body; and an exposure prevention member extending from the slide member into the first body when the slide member is rotated with respect to the first body.

According to features and utilities of the present general inventive concept, there is provided an electronic device including a first body including a first printed circuit board (PCB) and a top surface including a first opening; a second body including a second PCB and a bottom surface including a second opening and facing the top surface of the first body; a slide member slidably connected to the second body; a hinge unit to rotatably connect the slide member and the first body; and a flexible connection member to connect the first PCB and the second PCB, the flexible connection member extending from the first PCB, through the first opening and the second opening, and to the second PCB.

According to features and utilities of the present general inventive concept, there is provided an electronic device including a first body having a first printed circuit board (PCB); a second body having a second printed PCB; a slide member rotatably mounted to the first body to slide with respect to the second body; and a hinge unit mounted on the first body to rotate the slide member and the second body with respect to the first body.

BRIEF DESCRIPTION OF THE DRAWINGS

These and/or other features and utilities of the present general inventive concept will become apparent and more readily appreciated from the following description of the exemplary embodiments, taken in conjunction with the accompanying drawings of which.

DETAILED DESCRIPTION OF EXEMPLARY EMBODIMENTS

Reference will now be made in detail to exemplary embodiments of the present general inventive concept, examples of which are illustrated in the accompanying drawings, wherein like reference numerals refer to the like elements throughout. Exemplary embodiments are described below in order to explain the present general inventive concept while referring to the figures.

As used herein, the term "and/or" includes any and all combinations of one or more of the associated listed items.

Figure 1:
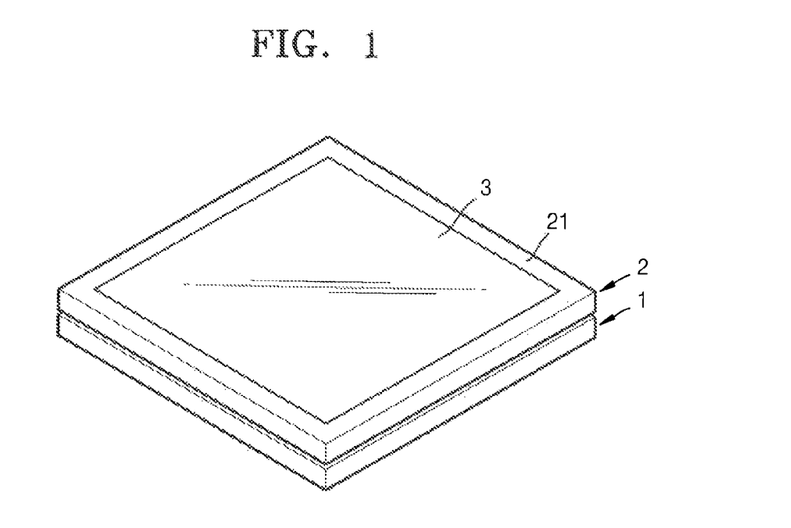
FIG. 1 is a perspective view of an electronic device according to exemplary embodiments of the present general inventive concept.
Figure 2:
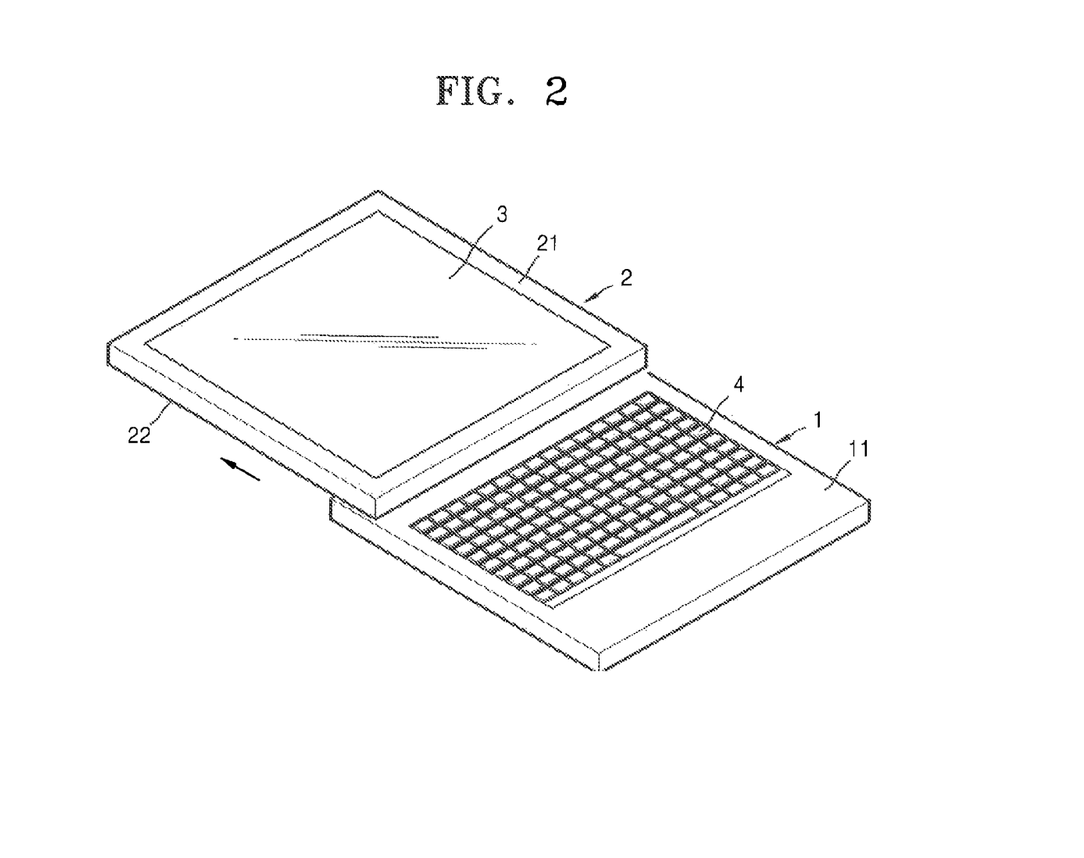
FIG. 2 is a perspective view of an electronic device according to exemplary embodiments of the present general inventive concept.
Figure 3:
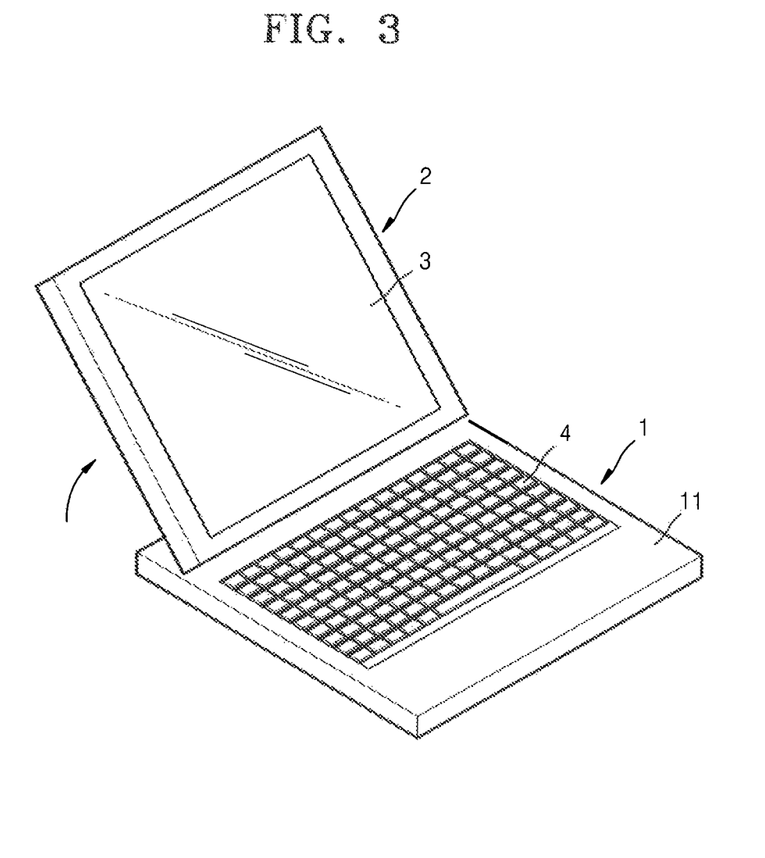
FIG. 3 is a front perspective view of an electronic device according to exemplary embodiments of the present general inventive concept.

FIGS. 1 through 3 are perspective views of an electronic device according to exemplary embodiments of the present general inventive concept. Referring to FIG. 1, the electronic device includes a first body 1 and a second body 2. The second body 2 may be disposed at a first position in which the second body 2 entirely or at least partially overlaps with the first body 1, as illustrated in FIG. 1, a second position in which the second body 2 slides and is dislocated from the first body 1, as illustrated in FIG. 2, and a third position in which the second body 2 tilts, or is tilted, with respect to the first body 1 from the second position, as illustrated in FIG. 3.

Referring to FIGS. 1 through 3, an image display window 3 is formed on or disposed at an upper surface 21 of the second body 2, which is opposite to a lower surface 22 of the second body 2, which faces the first body 1. Image information may be provided on the image display window 3 by a display unit 31 (see FIG. 6) included in the second body 2. The display unit 31 may be, for example, a liquid crystal display device, plasma display device, a flat panel display device using an organic light-emitting diode, or the like. A manipulation unit 4 may be formed on or disposed at an upper surface 11 of the first body 1, which faces the lower surface 22 of the second body 2. The manipulation unit 4 may be, for example, a keyboard, buttons, a touch pad, touch screen, or the like for operating the electronic device.

Although not shown in FIGS. 1 through 3, keys or buttons for manipulating the electronic device when the second body 2 is disposed at the first or closed position may be formed on the upper surface 21 or a side surface of the second body 2, or a lower surface or a side surface of the first body 1. Also, although not shown in FIGS. 1 through 3, a speaker that outputs sound may be formed on the first body 1 and/or the second body 2. In addition, a various-standard input/output port (not shown) for inputting and outputting audio signals and image signals and for connecting the electronic device to an external device, and a power supply port (not shown) for supplying power may be formed on the first body 1 and/or the second body 2.

Figure 4:
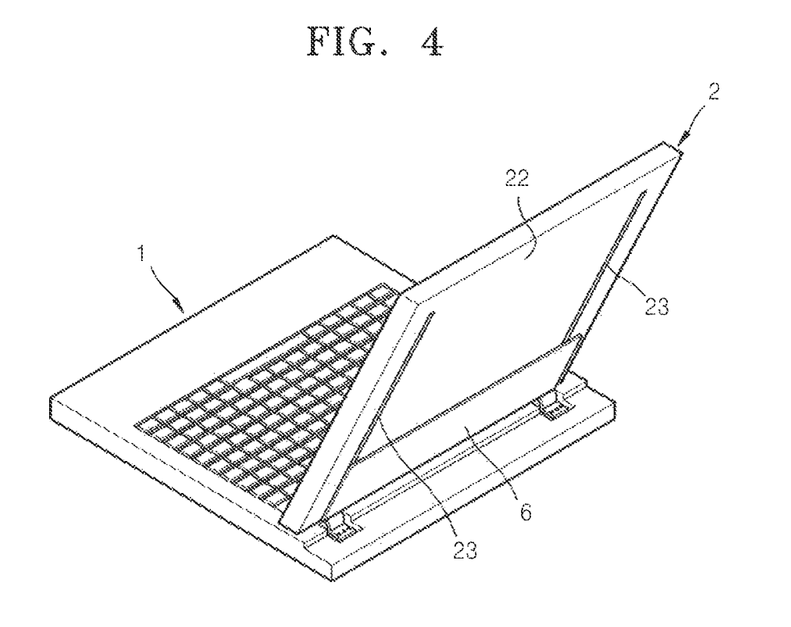
FIG. 4 is a rear perspective view of an electronic device according to exemplary embodiments of the present general inventive concept.
Figure 5:
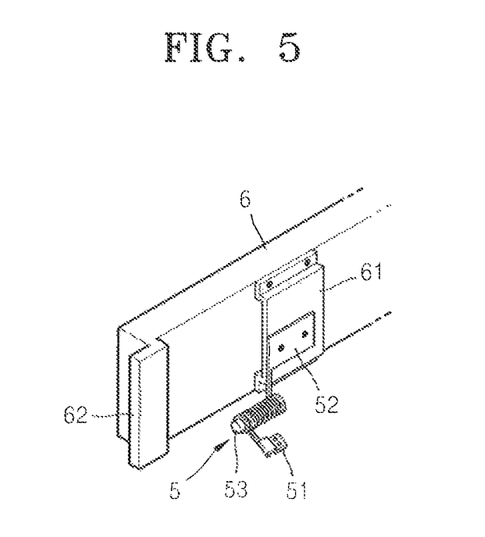
FIG. 5 is a perspective view showing a connection between a hinge unit and a slide member according to exemplary embodiments of the present general inventive concept.

FIG. 4 is a rear perspective view of the electronic device when the second body 2 is disposed at the third position according to exemplary embodiments of the present general inventive concept. FIG. 5 is an exploded perspective view of an example of a slide-tilt unit according to exemplary embodiments of the present general inventive concept. Referring to FIGS. 4 and 5, the slide-tilt unit includes a hinge unit 5 and a slide member 6. The hinge unit 5 is an assembly in which a fixed plate 51 and a rotating plate 52 are rotatably connected. The hinge unit 5 may include a rotation shaft 53 disposed between the fixed plate 51 and the rotating plate 52. A plurality of members for providing a friction resistance when the rotating plate 52 rotates, e.g., an elastic member, may be coupled to the rotation shaft 53. The fixed plate 51 is fixed to, for example, the first body 1, and the rotating plate 52 rotates about the rotation shaft 53 if a force greater than the friction resistance is applied to the rotating plate 52. Although only one hinge unit 5 is illustrated in FIG. 5, as illustrated in FIG. 4, two or more hinge units 5 may be formed if desired. Aspects need not be limited to the above, for example, the hinge unit 5 may be formed by fixing the rotation shaft 53 to the fixed plate 51, and rotatably coupling the rotating plate 52 to the rotation shaft 53.

The slide member 6 is connected to the rotating plate 52 via a hinge bracket 61. The hinge bracket 61 may be connected to the rotating plate 52 by using, for example, screws. The slide member 6 may connected to the hinge bracket 61. However, the connection between the slide member 6 and the rotating plate 52 need not limited thereto and the slide member 6 may be directly connected to the rotating plate 52.

Referring to FIG. 5, wings (protrusions) 62 are formed or disposed at at least one side of the slide member 6. Referring to FIG. 4, a pair of guide grooves 23 into which the protrusions 62 are inserted are formed in the lower surface 22 of the second body 2. The protrusions 62 may be disposed at opposite sides of the slide member 6 and may be disposed outside of the hinge brackets 61. If the protrusions 62 of the slide member 6 are inserted into the guide grooves 23, the second body 2 is connected to the slide member 6 so as to be slidable on the slide member 6. The protrusions 62 and the guide grooves 23 may have complementary shapes such that the protrusions 62 fit within the guide grooves 23 and are slideable therein. For example, the protrusions 62 may be L-shaped or T-shaped and extend away from a surface of the sliding member 6 attached to the hinge bracket 61 to be inserted into the guide grooves 23 having an L-shape or T-shape in which the L-shaped or T-shaped protrusions 62 may be slideable. Further, the protrusions 62 may have an L-shape while the guide grooves 23 have a T-shape but aspects are not limited thereto. Although illustrated in FIGS. 4 and 5 as being at opposite sides of the slide member 6, features and utilities are not limited thereto such that the protrusions 62 and the guide grooves 23 may disposed anywhere along the slide member 6 and the second body 2, respectively, such that the second body 2 may be slidable with respect to the first body 1 and/or the slide member 6. Also, features and utilities are not limited to multiple protrusions 62 and guide grooves 23 being included in the electronic device according to the present general inventive concept such that there may be only one protrusion 62 and one guide groove 23.

Figure 6:
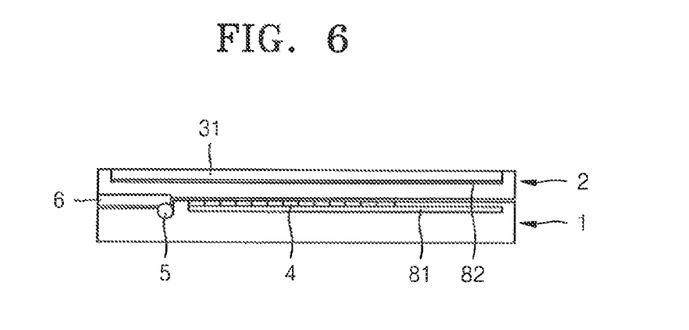
FIGS. 6 through 8 are side views respectively showing when a second body is disposed at a first position, a second position, and a third position according to exemplary embodiments of the present general inventive concept.
Figure 7:
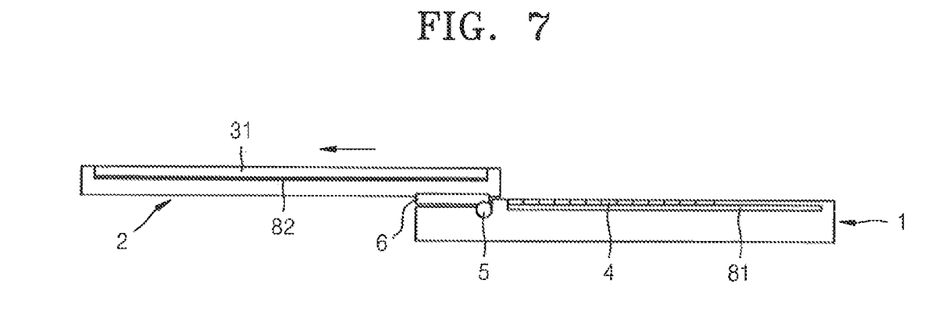

FIG. 6 is a side view showing the second body 2 disposed at the first or closed position with respect to the first body 1. FIG. 7 is a side view showing the second body 2 at the second or slid position with respect to the first body 1. FIG. 7 is a side view showing the second body 2 at the third or slid-and-tilted position with respect to the first body 1. Referring to FIG. 6, the second body 2 is disposed at the first position at which the second body 2 overlaps the first body 1. In this state, a user may carry or hold the electronic device. Also, if keys or buttons for manipulating the electronic device are formed on the upper surface 21 or the side surface of the second body 2, or the lower surface or the side surface of the first body 1, the user may use at least some functions of the electronic device by manipulating such keys or buttons.

The user may push the second body 2 to slide the second body 2 to the second position, as illustrated in FIG. 7. The second body 2 is guided by the guide grooves 23 and the wings 62 to slide on the slide member 6, and moves the second body 2 to the second position to expose the manipulation unit 4. In this state, the user may use functions of the electronic device by manipulating the manipulation unit 4.

Figure 8:
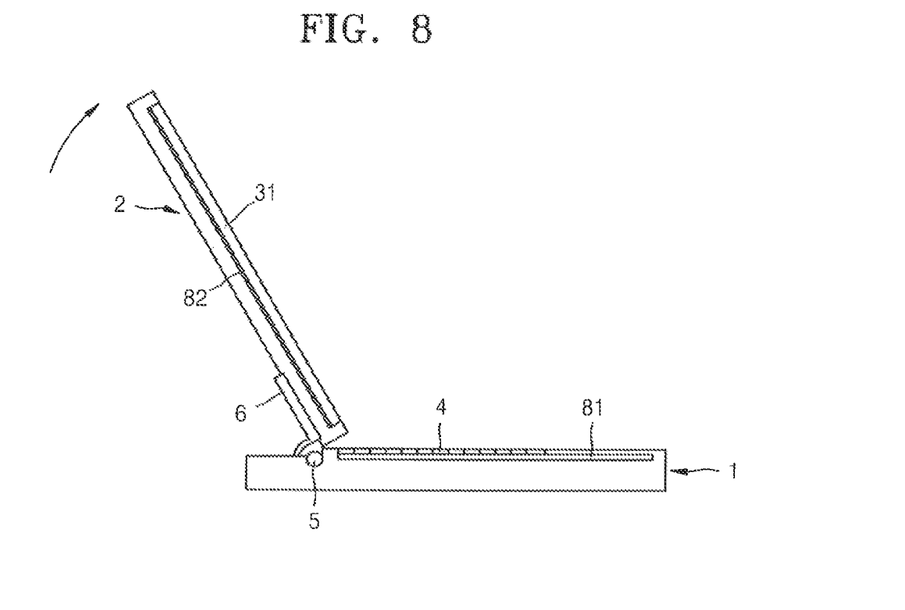

As illustrated in FIG. 8, the user may grab an upper portion of the second body 2 and may raise or tilt the second body 2 with respect to the first body 1 such that the upper surface 11 of the first body 1 and the upper surface 21 of second body 2 form an angle less than 180°. The second body 2 is connected to the rotating plate 52 of the hinge unit 5 via the slide member 6. Accordingly, the second body 2 rotates about the rotation shaft 53 to the third position, as illustrated in FIG. 8.

Figure 9:
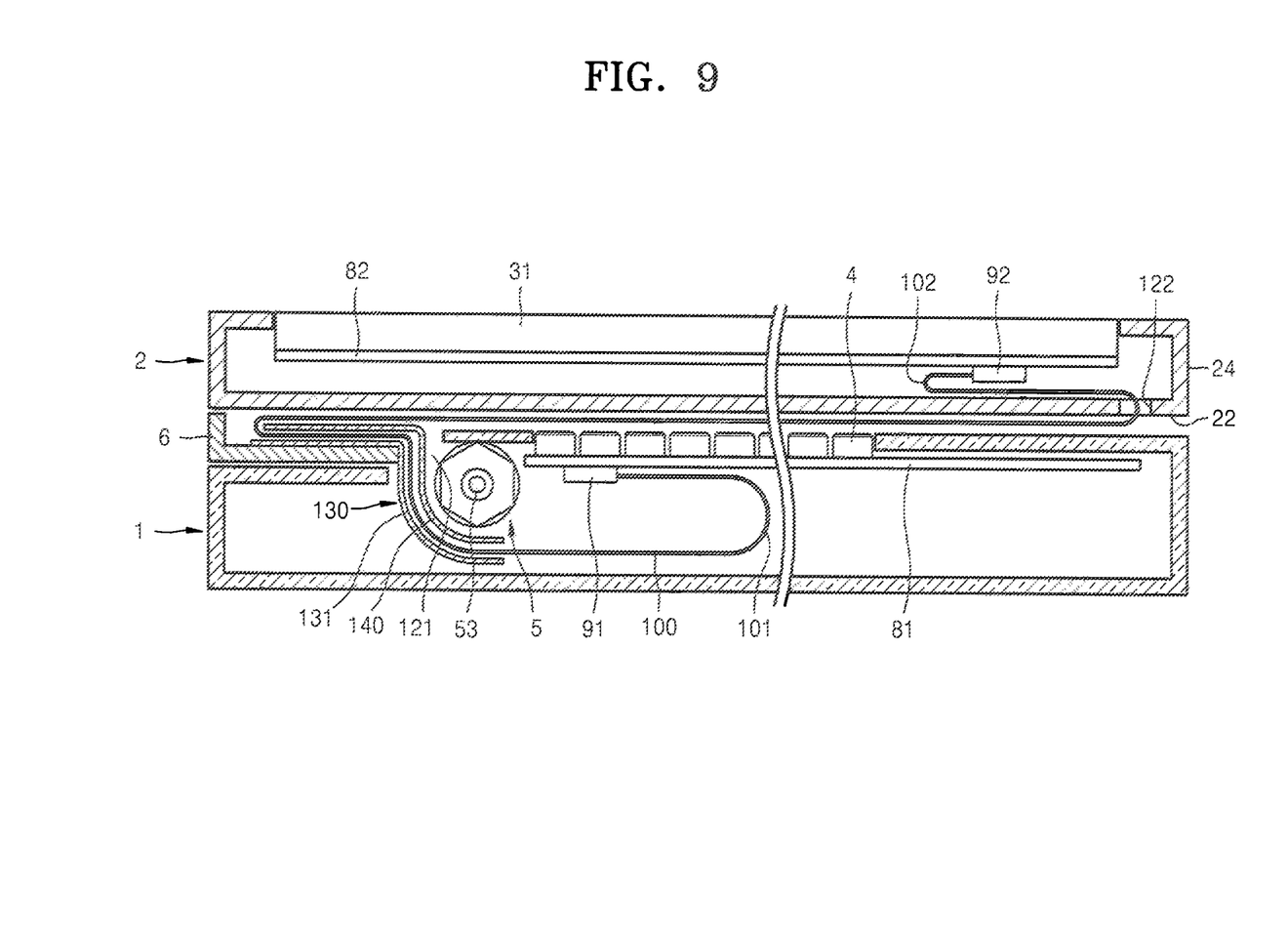
FIG. 9 is a cross-sectional view of a connection member according to exemplary embodiments of the present general inventive concept.

FIG. 9 is a cross-sectional view of a connection member when the second body 2 is disposed at the first position according to exemplary embodiments of the present general inventive concept. Referring to FIG. 9, a first printed circuit board (PCB) 81 is provided in the first body 1, and a second PCB 82 is provided in the second body 2. The first PCB 81 may be, for example, a control circuit board for controlling operation of the electronic device according to a manipulation signal of the manipulation unit 4. The second PCB 82 may be, for example, a PCB for controlling the display unit 31, or a PCB of the display unit 31. The first PCB 81 and the second PCB 82 may have one or more semiconductor chips, for example, semiconductor memory chips or processor chips, and electrical components to perform the functions of the electronic device.

The first and second PCBs 81 and 82 are electrically connected to each other. Referring to FIG. 9, the first and second PCBs 81 and 82 are connected to each other by a connection member 100 having flexibility, for example, a flexible printed circuit (FPC). One end of the connection member 100 is connected to a connector 91 of the first PCB 81, and the other end is connected to a connector 92 of the second PCB 82.

A first opening 121 that penetrates the upper surface 11 of the first body 1 is formed in a rear portion of the first body 1, i.e., a portion behind the hinge unit 5. The first opening 121 is at a position at which the first opening 121 is covered by the slide member 6 when the second body 2 is at the first position and the second position. A second opening 122 that penetrates the lower surface 22 of the second body 2 is formed in a front portion of the second body 2, i.e., a portion opposite to the hinge unit 5. The second opening 122 may be formed at a position slightly behind a front surface 24 of the second body 2. As will be described below, the second opening 122 is at a position at which the second opening 122 is covered by the slide member 6 when the second body 2 is at the second position and the third position.

A first end of the connection member 100 is connected to the connector 91 of the first PCB 81. The connection member 100 extends forward and then backward to form a surplus part 101, and extends out of the first body 1 through the first opening 121. For example, the connection member 100 extends away from the connector 91 in a direction opposite from the first opening 121 and is bent or curved to extend to and through the first opening 121. The connection member 100 extends between the first and second bodies 1 and 2 and then into the second body 2 through the second opening 122, and extends backward and then forward to form a bent part 102. For example, the connection member 100 may exit the first opening 121, extend away from both the first opening 121 and the second opening 122, bend or curve toward the second opening 122, bend or curve to extend beyond the connector 92, and then bend or curve back to connect to the connector 92. A second end of the connection member 100 is connected to the connector 92 of the second PCB 82. As such, the connection member 100 disposed between the first and second PCBs 81 and 82 may have a general "W" shape.

Due to the above-described configuration, when the second body 2 is disposed at the first position illustrated in FIGS. 1, 6, and 9, the connection member 100 is disposed in the first body 1, between the slide member 6 and the second body 2, between the first and second bodies 1 and 2, and in the second body 2. Also, the first opening 121 is covered by the slide member 6, and the second opening 122 formed in the lower surface 22 of the second body 2 is covered by the first body 1 because the first and second bodies 1 and 2 overlap with each other. Accordingly, the connection member 100 is not externally exposed.

Figure 10:
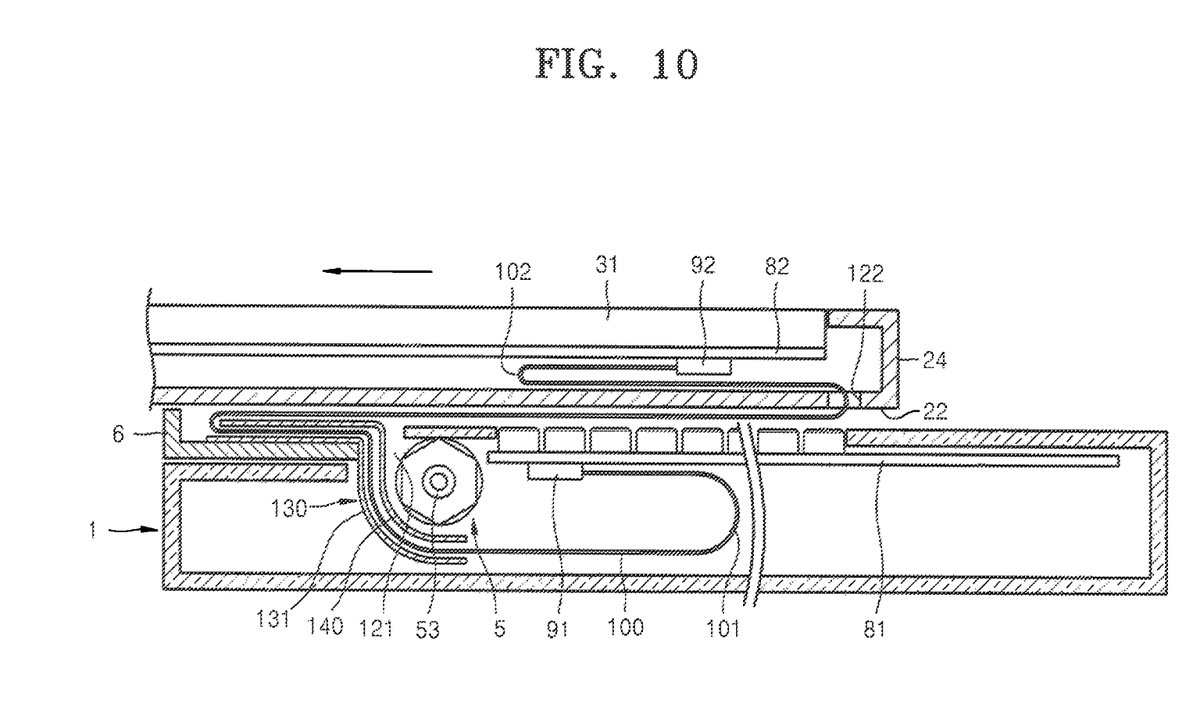
FIG. 10 is a cross-sectional view of a connection member according to exemplary embodiments of the present general inventive concept.
Figure 11:
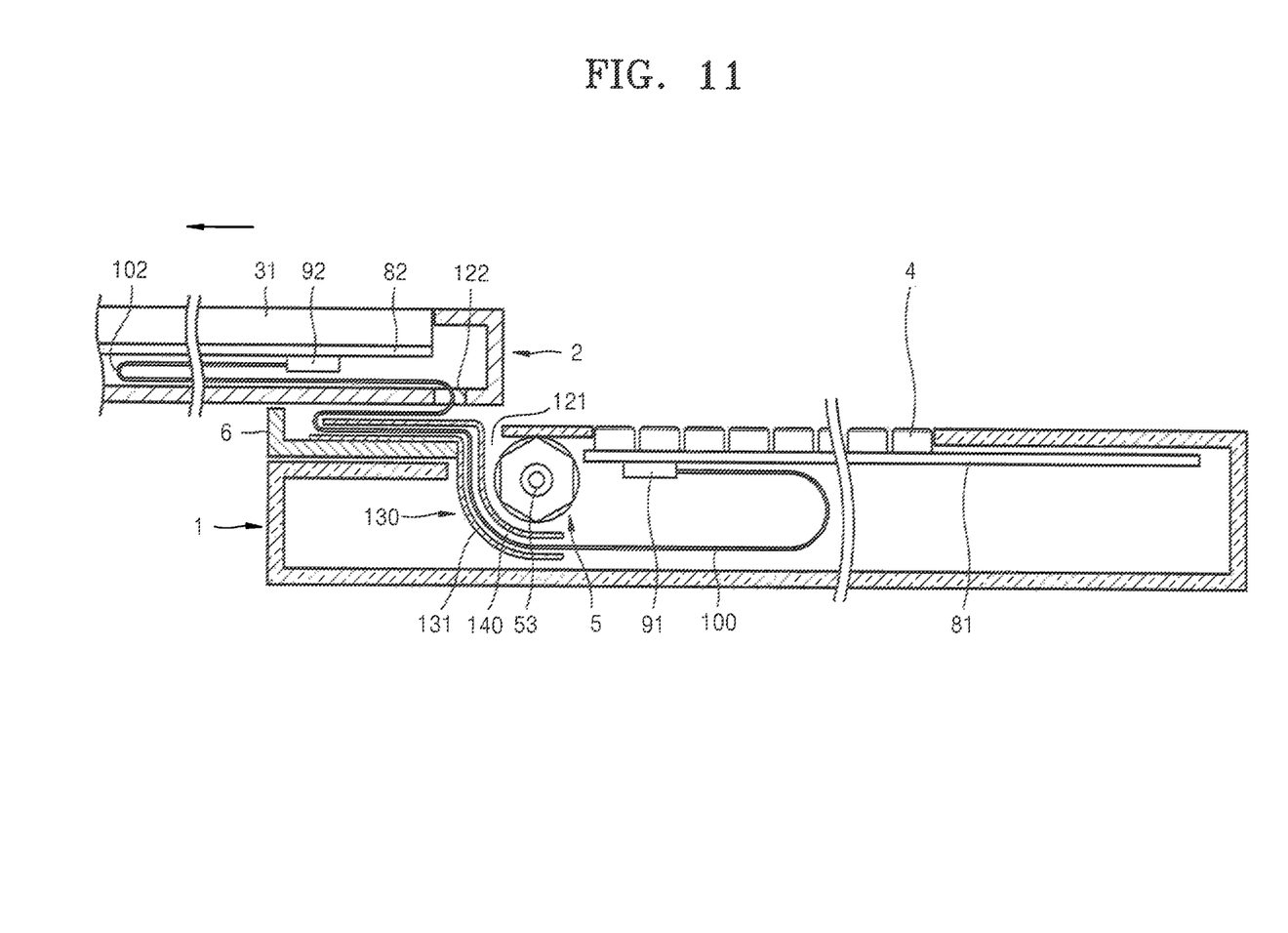
FIG. 11 is a cross-sectional view of a connection member according to exemplary embodiments of the present general inventive concept.

FIG. 10 is a cross-sectional view of a connection member according to exemplary embodiments of the present general inventive concept. If the second body 2 is pushed backward to place the second body 2 at the second position, the connection member 100 that extends between the first and second bodies 1 and 2 is pushed into the second body 2 through the second opening 122. Then, as illustrated in FIG. 10, the bent part 102 of the connection member 100 moves backward and thus the connection member 100 pushed into the second body 2 is accommodated in the second body 2. For example, as the second body 2 is moved from the first position to the second position, the portion of the connection member 100 disposed between the first opening 121 and the second opening 122 is accommodated in the second body 2 as the bent part 102. As the second body 2 moves closer to the second position, the bent part 102 of the connection member 100 accommodated in the second body 2 increases in length. If the second body 2 reaches the second position, as illustrated in FIG. 11, the connection member 100 is disposed in the first body 1, between the second body 2 and the slide member 6, and in the second body 2. Also, the first and second openings 121 and 122 are covered by the slide member 6. Accordingly, the connection member 100 is not externally exposed.

FIG. 11 is a cross-sectional view of a connection member according to exemplary embodiments of the present general inventive concept. As shown in FIG. 11, the second body 2 is disposed in the second position. In order to place the second body 2 at the third position, the second body 2 rotates about the rotation shaft 53 of the hinge unit 5. When the second body 2 rotates from the second position to the third position, the connection member 100 is slightly pulled toward the second body 2 to generate a tensile force. In order to prevent the connection member 100 from being broken or being separated from the connectors 91 and 92 due to the tensile force, as illustrated in FIGS. 9 through 11, the first end of the connection member 100 connected to the connector 91 extends slightly forward and then backward. As such, the connection member 100 has the surplus part 101, and the tensile force generated when the second body 2 rotates from the second position to the third position may be absorbed by the surplus part 101.

Figure 12:
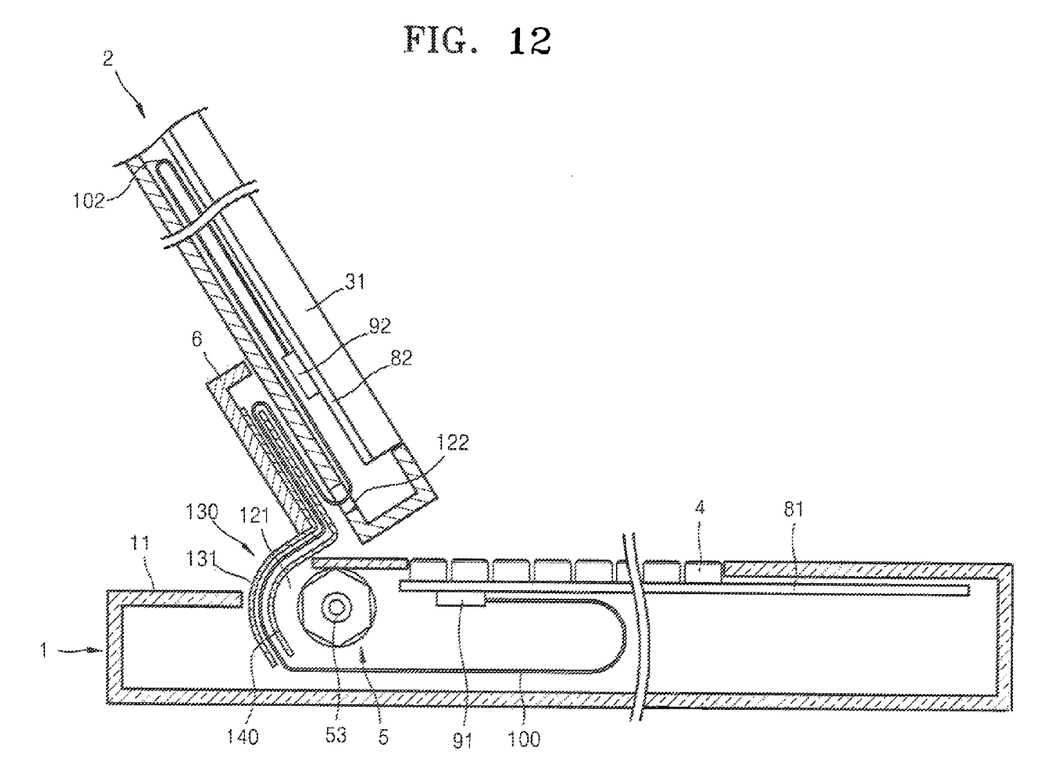
FIG. 12 is a cross-sectional view of a connection member according to exemplary embodiments of the present general inventive concept.

FIG. 12 is a cross-sectional view of a connection member according to exemplary embodiments of the present general inventive concept. As illustrated in FIG. 12, when the second body 2 is disposed at the third position, the connection member 100 is disposed in the first body 1, between the second body 2 and the slide member 6, and in the second body 2. The second opening 122 is covered by the slide member 6. However, since the slide member 6 rotates about the rotation shaft 53 and is spaced apart from the upper surface 11 of the first body 1, the first opening 121 and the connection member 100 outside the first opening 121 may be externally exposed. In order to prevent this, referring to FIGS. 9 through 12, an exposure prevention member 130 is formed. The exposure prevention member 130 rotates together with the slide member 6. The exposure prevention member 130 has a shape capable of ensuring a space for passing the connection member 100 between the exposure prevention member 130 and the rotation shaft 53. The exposure prevention member 130 is connected to the slide member 6 and extends from the slide member 6 into the first opening 121. An extending part 131 of the exposure prevention member 130 is disposed behind and is spaced apart from the rotation shaft 53. As such, the connection member 100 passes between the rotation shaft 53 of the hinge unit 5 and the exposure prevention member 130 through the first opening 121. Accordingly, even when the electronic device is viewed from a rear side of the electronic device, the connection member 100 is covered by the exposure prevention member 130 and is not externally exposed.

An elastic member, a washer, etc. for applying a friction resistance when the rotating plate 52 rotates is coupled to the rotation shaft 53 of the hinge unit 5. If the connection member 100 contacts the elastic member and the washer, the connection member 100 may be damaged. In order to prevent damage to the connection member 100, referring to FIGS. 9 through 12, a protection member 140 may be disposed between the rotation shaft 53 and the exposure prevention member 130. The protection member 140 rotates together with the slide member 6. The protection member 140 is connected to the slide member 6 and/or the exposure prevention member 130 and extends from the slide member 6 into the first opening 121. The protection member 140 and the exposure prevention member 130 are spaced apart from each other. The connection member 100 passes between the protection member 140 and the exposure prevention member 130 through the first opening 121. As such, by disposing the protection member 140 between the connection member 100 and the rotation shaft 53, damage to the connection member 100 may be prevented due to interference between the connection member 100 and the rotation shaft 53.

The protection member 140 may extend to surround a portion of the rotation shaft 53 so that the connection member 100 does not contact the rotation shaft 53 when the second body 2 is disposed at or between the first position, the second position, and the third position. Also, as illustrated in FIG. 11, since the protection member 140 is disposed in front of the exposure prevention member 130, the connection member 100 may not be externally exposed at a front side of the electronic device when the second body 2 is disposed at the third position.

As described above, by coupling the exposure prevention member 130 to the slide member 6 and extending the exposure prevention member 130 through the first opening 121 to be near the rotation shaft 53, the connection member 100 may not be exposed at a rear side of the electronic device when the second body 2 is disposed at the third position. Also, by disposing the protection member 140, which forms together with the exposure prevention member 130 a space through which the connection member 100 passes, between the exposure prevention member 130 and the rotation shaft 53, interference between the connection member 100 and the rotation shaft 53 may be prevented. Furthermore, by extending the protection member 140 through the first opening 121 and rotating the protection member 140 together with the slide member 6, the connection member 100 may not be exposed at a front side of the electronic device when the second body 2 is disposed at the third position. As such, since the connection member 100 is prevented from being externally exposed, an overall appearance of the electronic device may be improved.

Transposition from the third position to the first position may be performed oppositely to the transposition from the first position to the third position. In this case, as the second body 2 slides, the connection member 100 accommodated in the second body 2 is naturally pushed into the space between the first and second bodies 1 and 2 through the second opening 122.

Features and utilities of the present general inventive concept may be applied to a game console, a communication terminal, a multimedia device for reproducing voice information, or image information and voice information, a laptop computer, a tablet computer, etc.

Although a few exemplary embodiments of the present general inventive concept have been shown and described, it will be appreciated by those skilled in the art that changes may be made in these exemplary embodiments without departing from the principles and spirit of the general inventive concept, the scope of which is defined in the appended claims and their equivalents.

What is claimed is:

1. An electronic device comprising:
a first body comprising a first printed circuit board (PCB);
a second body comprising a second PCB, and the second body being moveable between a first position at which the second body at least partially overlaps the first body, a second position at which the second body is extended from the first body, and a third position at which the second body is rotated with respect to the first body;
a slide member disposed between the first and second bodies, the slide member being rotatably coupled to the first body and slidably coupled the second body;
a flexible connection member to electrically connect the first and second PCBs;
a first opening formed in an upper surface of the first body, the connection member extending through the first opening;
a second opening formed in a lower surface of the second body, the connection member extending through the second opening, the upper surface of the first body and the lower surface of the second body being adjacent to and facing each other when the second body is disposed at the first position, and the first opening and the second opening being disposed at opposite sides of the first surface and second surface, respectively, when the second body is disposed at the first position; and
an exposure prevention member disposed to prevent the connection member from being exposed between the first opening and the second body when the second body is disposed at the third position, the exposure prevention member rotating together with the slide member.

2. The electronic device of claim 1, further comprising:
a rotation shaft about which the second body rotates to the third position; and
a protection member disposed between the exposure prevention member and the rotation shaft to form together with the exposure prevention member a space through which the connection member passes, the protection member rotating together with the slide member.

3. The electronic device of claim 2, wherein the protection member prevents the connection member from interfering with the rotation shaft when the second body is disposed at the first position, the second position, and the third position.

4. The electronic device of claim 1, wherein the first opening is covered by the slide member when the second body is disposed at the first position and the second position, and wherein the second opening is covered by the slide member when the second body is disposed at the second position and the third position.

5. The electronic device of claim 4, wherein the second opening is formed behind a front surface of the second body and is covered by the first body when the second body is disposed at the first position.

6. An electronic device comprising:
a first body comprising a first printed circuit board (PCB);
a hinge unit comprising a fixed plate fixed to the first body, a rotation shaft connected to the fixed plate, and a rotating plate being rotatable about the rotation shaft;
a slide member connected to the rotating plate and being rotatable about the rotation shaft with respect to the first body;
a second body comprising a second PCB, the second body being slidably connected to the slide member, and the second body being moveable between a first position at which the second body overlaps the first body, a second position at which the second body is slid on the slide member and extended from the first body, and a third position in which the second body is tilted with respect to the first body according to a rotation of the slide member;
a flexible connection member to electrically connect the first and second PCBs;
a first opening formed in an upper surface of the first body, the connection member extending through the first opening, and the first opening being covered by the slide member if the second body is disposed at one of the first position and the second position;
a second opening formed in a lower surface of the second body, the connection member extending through the second opening, and the second opening being covered by the slide member when the second body is disposed at one of the second position and the third position; and
an exposure prevention member connected to the slide member to prevent the connection member from being exposed when the second body is disposed at the third position.

7. The electronic device of claim 6, wherein the second opening is located behind a front surface of the second body and is covered by the first body when the second body is disposed at the first position.

8. The electronic device of claim 6, wherein the connection member passes through the first opening at a rear side of the rotation shaft.

9. The electronic device of claim 8, wherein the exposure prevention member extends through the first opening into the first body.

10. The electronic device of claim 9, further comprising a protection member to prevent interference between the rotation shaft and the connection member.

11. The electronic device of claim 10, wherein the protection member rotates together with the slide member.

12. The electronic device of claim 11, wherein the protection member prevents the connection member from being exposed to a front side of the electronic device when the second body is disposed at the third position.

13. The electronic device of claim 10, wherein the protection member extends from the slide member through the first opening into the first body.

14. The electronic device of claim 13, wherein the protection member extends between the exposure prevention member and the rotation shaft to form together with the exposure prevention member a space through which the connection member passes.

15. The electronic device of claim 13, wherein the protection member prevents the connection member from interfering with the rotation shaft when the second body is disposed at the first position, the second position, and the third position.

16. An electronic device comprising:
a first body comprising a first printed circuit board (PCB);
a second body comprising a second PCB;
a slide member slidably connected to the second body;
a hinge unit to rotatably connect the slide member and the first body; and
an exposure prevention member extending from the slide member into the first body when the slide member is rotated with respect to the first body.

17. The electronic device of claim 16, further comprising a protection member extending from the slide member into the first body when the slide member is rotated with respect to the first body, the protection member being disposed between the exposure prevention member and the hinge unit.

18. The electronic device of claim 17, further comprising a flexible connection member to electrically connect the first PCB and the second PCB, the flexible connection member extending between the first body and the second body via a space between the exposure prevention member and the protection member.

19. An electronic device comprising:
a first body comprising a first printed circuit board (PCB) and a top surface including a first opening;
a second body comprising a second PCB and a bottom surface including a second opening and facing the top surface of the first body;
a slide member slidably connected to the second body;
a hinge unit to rotatably connect the slide member and the first body; and
a flexible connection member to connect the first PCB and the second PCB, the flexible connection member extending from the first PCB, through the first opening and the second opening, and to the second PCB, the flexible connection member having a portion disposed at least partially around the hinge unit; and
an exposure preventing member disposed around the portion of the flexible connection member.

20. The electronic device of claim 19, wherein the first body and second body are disposable in a first position in which the second body covers the first body, a second position in which the second body is slid on the slide member to expose at least a portion of the top surface of the first body; and a third position in which the second body is slid to expose a portion of the top surface of the first body and rotated with respect to the first body.

21. The electronic device of claim 20, wherein, when the first body and the second body are disposed in one of the first position and second position, the connection member comprises a surplus part disposed in the first body, the surplus part being to allow the rotation of the second body with respect to the first body without damaging the connection between the connection member and the first PCB.

22. The electronic device of claim 20, where, when the first body and the second body are disposed in the first position, the connection member extends from the first opening to the second opening and between the first body and the second body, the first opening and second opening being disposed at opposite end portions of the device when the first body and the second body are disposed in the first position.

23. The electronic device of claim 20, wherein, when the first body and the second body are disposed in one of the second position and the third position, the connection member comprises a bent part disposed in the second body, the bent part comprising a portion of the connection member that extends from the first opening to the second opening and between the first body and the second body when the first body and the second body are disposed in the first position.

24. An electronic device comprising:
a first body having a first printed circuit board (PCB);
a second body having a second printed PCB;
a slide member rotatably mounted to the first body to slide with respect to the second body;
a hinge unit mounted on the first body to rotate the slide member and the second body with respect to the first body;
a flexible connection member to connect the first PCB and the second PCB, the flexible connection member having a portion exposed between the slide member and the first body; and
an exposure prevention member disposed to cover the exposed portion of the flexible connection member.

* * * * *

UNITED STATES PATENT AND TRADEMARK OFFICE
CERTIFICATE OF CORRECTION

PATENT NO. : 8,964,377 B2
APPLICATION NO. : 13/562451
DATED : February 24, 2015
INVENTOR(S) : Sung-wook Choi It is certified that error appears in the above-identified patent and that said Letters Patent is hereby corrected as shown below:

Claims

Claim 1, Column 9, Line 45

After "coupled" insert --to--.

Claim 19, Column 11, Line 45

After "body;" delete "and".

Signed and Sealed this
Thirteenth Day of October, 2015

Michelle K. Lee
*Director of the United States Patent and Trademark Office*